(12) United States Patent
Wojciak

(10) Patent No.: US 6,890,399 B2
(45) Date of Patent: May 10, 2005

(54) (METH)ACRYLATE COMPOSITIONS HAVING A SELF-INDICATOR OF CURE AND METHODS OF DETECTING CURE

(75) Inventor: Stan Wojciak, New Britain, CT (US)

(73) Assignee: Henkel Corporation, Rocky Hill, CT (US)

( * ) Notice: Subject to any disclaimer, the term of this patent is extended or adjusted under 35 U.S.C. 154(b) by 189 days.

(21) Appl. No.: 10/050,711

(22) Filed: Jan. 18, 2002

(65) Prior Publication Data

US 2003/0139488 A1 Jul. 24, 2003

(51) Int. Cl.[7] .......................... B32B 31/00; G01N 21/63; G01N 21/78; C08J 3/28
(52) U.S. Cl. ................. 156/275.5; 156/275.7; 522/75; 524/325; 524/324; 524/323; 436/172
(58) Field of Search ........................... 156/275.5, 275.7; 522/75, 103, 96, 182; 524/325, 324, 323; 436/172

(56) References Cited

U.S. PATENT DOCUMENTS

| 4,581,427 | A | | 4/1986 | Dunn et al. ................. 526/147 |
|---|---|---|---|---|
| 5,100,802 | A | * | 3/1992 | Mickols ........................ 436/34 |
| 5,302,627 | A | * | 4/1994 | Field et al. .................... 522/13 |
| 5,583,178 | A | * | 12/1996 | Oxman et al. ............... 524/862 |
| 5,606,171 | A | * | 2/1997 | Neckers et al. ........... 250/459.1 |
| 5,677,107 | A | * | 10/1997 | Neckers ........................ 430/269 |
| 5,707,781 | A | | 1/1998 | Wilzak ..................... 430/281.1 |
| 5,933,559 | A | * | 8/1999 | Petisce ......................... 385/114 |
| 5,955,002 | A | * | 9/1999 | Neckers et al. ......... 252/301.35 |
| 6,017,983 | A | | 1/2000 | Gilleo .......................... 523/442 |
| 6,080,450 | A | | 6/2000 | Cantor ......................... 427/517 |
| 6,200,646 | B1 | * | 3/2001 | Neckers et al. ............. 427/510 |
| 6,312,644 | B1 | | 11/2001 | Moriarty et al. .............. 422/14 |
| 6,444,725 | B1 | | 9/2002 | Trom et al. .................. 523/118 |

* cited by examiner

*Primary Examiner*—Susan Berman
(74) *Attorney, Agent, or Firm*—Steven C. Bauman

(57) ABSTRACT

Polymerizable compositions for use in or as adhesives, sealants and/or coatings are disclosed herein. The compositions include a (meth)acrylate component together with a dye substantially dissolved in the (meth)acrylate component which imparts a first color to the (meth)acrylate component. Upon curing, a resultant cured composition has a second color. The invention also relates to a method of detecting substantially full cure of the polymerization of the compositions.

27 Claims, No Drawings

(METH)ACRYLATE COMPOSITIONS HAVING A SELF-INDICATOR OF CURE AND METHODS OF DETECTING CURE

BACKGROUND OF THE INVENTION

1. Field of the Invention

This invention relates to polymerizable compositions for use in or as adhesives, sealants and/or coatings. The compositions include a (meth)acrylate component together with a dye substantially dissolved in the (meth)acrylate component which imparts a first color to said (meth)acrylate component. Upon curing, a resultant cured composition has a second color. The invention also relates to a method of detecting substantially full cure of the compositions.

2. Brief Description of Related Technology

Fluorescing agents have been incorporated into curable compositions to provide a non-destructive method for inspection, to identify the presence of cured films, and to ensure proper coverage of the coating on an article. Heretofore, the addition of the fluorescing agent, however, does not provide a change in color to determine whether the composition has fully cured; rather the fluorescing agent provided fluorescence.

Analytical instrumentation has been developed for determining cure on production lines. However, such instrumentation is expensive and oftentimes impractical due to floor space constraints in the manufacturing environment.

U.S. Pat. No. 5,707,781 (Wilczak) discloses a photopolymerizable composition having one or more acyl or diacyl phosphine oxide photoinitiators in combination with a fluorescent optical brightener. The fluorescent optical brighteners enhances the photosensitivity of the acyl or diacyl phosphine oxide photoinitiators. The disclosed composition is not reported to substantially change color on exposure to actinic radiation when used, such as in the top layer of a color proofing element to remedy unwanted discoloration.

U.S. Pat. No. 6,080,450 (Cantor) describes the use of a UV/VIS (ultra violet/visible) phosphine oxide photoinitiator to cure a polymerizable acrylate formulation, with the presence of a fluorescing agent to confer a visible response.

U.S. Pat. No. 5,302,627 (Field) reports the addition of a dye to UV radiation curable silicone-containing polymeric compositions which contain photoinitiators. Upon exposure to UV radiation, the silicone-containing polymeric composition undergoes a color change indicating that the composition has cured. The dyes used include an anthraquinone dye having a Color Index Solvent Blue 104, 1-hydroxy-4-[(methylphenyl)amino]-9,10-anthracenedione, and an azo dye mixture of azo benzene azo naphthyl benzene amine alkyl/alkoxy derivatives having a Color Index Solvent Blue 99, and azo benzene azo naphthyl benzene amine alkyl derivatives having a Color Index Solvent Red 166. Large amounts of the dye, greater than 30 ppm based on the weight of the composition, are reported to inhibit cure.

U.S. Pat. No. 6,017,983 (Gilleo) appears to refer to the use of a diazo dye that is believed to form a salt or complex with acid anhydrides, which acts as a color indicator for particular anhydride/epoxy resin thermoset adhesives. The resulting salt or complex is reported to produce a chromophoric shift in the dye which is indicative of the amount of acid anhydride present, and hence, the degree of cure. As the epoxy resin cures, the amount of acid anhydride diminishes, thus, producing a color change. This system appears to be limited to acid anhydride hardeners used to cure epoxy resins.

U.S. Pat. No. 6,312,644 B1 (Moriarty) appears to teach the use of pyranine fluorescent monomers for tagging polymers used in industrial waste water treatment systems as a means for determining the amount of the polymer treatment agent. The fluorescence of the polymer is a direct measure of the concentration of the tagged polymer in the water. Thus, a real time in situ decline in the fluorescence indicates that a non-desired event such as scaling is occurring.

Notwithstanding the state of the technology, it would be desirable to provide a (meth)acrylate composition that demonstrates "self-indicating" capabilities to detect when cure has been achieved.

SUMMARY OF THE INVENTION

In a first aspect, the present invention is directed to a (meth)acrylate composition comprising a (meth)acrylate component; and a dye substantially dissolved in the (meth)acrylate component which imparts a first color to the (meth)acrylate component, wherein upon curing, a resultant cured composition has a second color. Preferably, upon curing, the resultant cured composition is substantially free of the first color.

The (meth)acrylate component may comprise one or more members selected from the group consisting of a monomer represented by the formula:

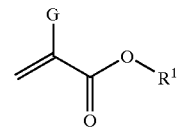

where G is hydrogen, halogen, or an alkyl having from 1 to 4 carbon atoms, $R^1$ has from 1 to 16 carbon atoms and is an alkyl, cycloalkyl, alkenyl, cycloalkenyl, alkaryl, aralkyl, or aryl group, optionally substituted or interrupted with silane, silicon, oxygen, halogen, carbonyl, hydroxyl, ester, carboxylic acid, urea, urethane, carbamate, amine, amide, sulfur, sulfonate, or sulfone;

a di- or tri-(meth)acrylate selected from polyethylene glycol di(meth)acrylates, bisphenol-A di(meth) acrylates, tetrahydrofurane di(meth)acrylates, hexanediol di(meth)acrylate, trimethylol propane tri(meth) acrylate, or combinations thereof; and an acrylate ester represented by the formula:

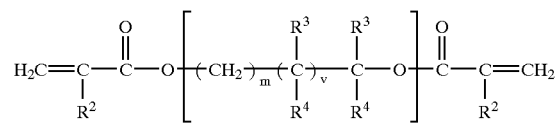

where $R^2$ is hydrogen, halogen, or an alkyl having about 1 to about 4 carbon atoms, $R^3$ is hydrogen, an alkyl having about 1 to about 4 carbon atoms, hydroxyalkyl having about 1 to about 4 carbon atoms or

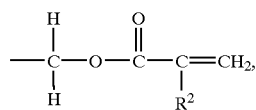

$R^4$ is hydrogen, hydroxy or

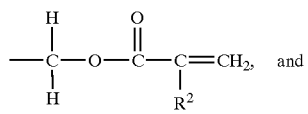

m is 1 to 8, n is 1 to 20, and v is 0 or 1.

Preferably, the dye is a member selected from anthraquinone dyes, xanthene dyes, and combinations thereof. More preferred dyes include fluorescein, dibromofluorescein, diiodofluorescein, tetrabromofluorescein, tetraiodofluorescein, tetrabromotetrachlorofluorescein, and combinations thereof. The dye is preferably present in an amount of about 50 ppm to about 1000 ppm, and more preferably about 100 to 200 ppm, based on the amount of the (meth)acrylate component.

In a second aspect, the present invention is directed to an adhesive composition, which includes a (meth)acrylate component; a member selected from stabilizers, accelerators, fillers, opacifiers, thickeners, viscosity modifiers, adhesion promoters, inhibitors, thixotrophy conferring agents, tougheners, anti-oxidizing agents, anti-reducing agents, and combinations thereof; and a dye in an amount of about 100 to 200 ppm, based on an amount of the (meth)acrylate component, where the dye imparts a color to the (meth) acrylate component, and where upon curing, the cured (meth)acrylate component is substantially color-free.

In a third aspect, the present invention is directed to a method of making a cured composition. The method includes the steps of providing a (meth)acrylate component; providing a dye; substantially dissolving the dye in the (meth)acrylate component to form a composition having a first color; and curing the composition to form a cured composition having a second color. Preferably, prior to the step of curing the (meth)acrylate component, the (meth) acrylate component has a fluorescent first color. Preferably, after the step of curing the (meth)acrylate component, the cured composition is substantially free of the first color and fluorescence. Photocuring is a preferred method of cure.

In a fourth aspect, the present invention is directed to a method of detecting substantially full cure of an adhesive. This method includes the steps of providing a first article and a second article; providing, on a surface of the first article, a fluorescent adhesive comprising a (meth)acrylate component and a fluorescent dye; contacting a surface of the second article to the surface of the first article having the adhesive thereon; exposing the first and second articles to cure conditions; and detecting the absence of fluorescence of the adhesive. The method may further include the step of detecting the absence of the first color after exposing the first and second articles to cure conditions.

In a fifth aspect, the present invention is directed to a method of assembling and inspecting a series of articles having an adhesive bond line. This method includes the steps of adhering two or more parts of an article together with a fluorescent adhesive; exposing the article to adhesive curing conditions; and detecting the absence of fluorescence of the adhesive at the bond lines as an indication of substantially full cure. The fluorescent adhesive includes a (meth)acrylate component and a fluorescent dye. And an adhesive bond line is formed between the parts of the article.

DETAILED DESCRIPTION OF THE INVENTION

The present invention is directed to (meth)acrylate compositions, and adhesives, which include the (meth) acrylate compositions, having a (meth)acrylate component, and a dye substantially dissolved in the (meth)acrylate component to provide a first color to the uncured (meth) acrylate composition. Upon exposure to cure conditions, the cured (meth)acrylate composition undergoes a color and fluorescence change as an indication of cure. Preferably, the uncured (meth)acrylate composition has a visible color which also luminesces under black light conditions, where upon cure, the resulting cured composition is substantially visually color-free, and preferably, no longer fluorescent. The present invention is also directed to a method of making a cured composition, which is based on the (meth)acrylate composition, to methods of using the (meth)acrylate compositions in detecting cure of an adhesive composition, and to assembling and inspecting a series of articles having a bond line. As used herein, the terms (meth)acrylic and (meth)acrylate are used synonymously with regard to the monomer and monomer-containing component. The terms (meth)acrylic and (meth)acrylate include acrylic, methacrylic, acrylate and methacrylate.

The ethylenically unsaturated, free radical polymerizable monomers in the photopolymerizable composition of the present invention preferably include addition polymerizable, non-gaseous (boiling temperature above 100° C. at normal atmospheric pressure), ethylenically-unsaturated organic compounds containing at least one, and preferably at least two, terminal ethylenically unsaturated groups, and being capable of forming a high weight average molecular weight polymer by free radical initiated, chain propagating addition polymerization. The most preferred compounds are acrylate or (meth)acrylate monomers, as are well known in the art. Suitable polymerizable monomers nonexclusively include triethylene glycol dimethacrylate, tripropylene glycol diacrylate, tetraethylene glycol dimethacrylate, diethylene glycol dimethacrylate, 1,4-butanediol diacrylate, 1,6-hexanediol dimethacrylate, pentaerythritol tetraacrylate, trimethylol propane triacrylate, trimethylol propane trimethacrylate, dipentaerythritol monohydroxypentaacrylate, pentaerythritol triacrylate, bisphenol-A-ethoxylate dimethacrylate, trimethylolpropane ethoxylate triacrylate, trimethylolpropane propoxylate triacrylate, and bisphenol-A-diepoxide dimethacrylate.

The more preferred (meth)acrylate composition comprises a (meth)acrylate component comprising one or more members selected from the group consisting of a monomer represented by the formula:

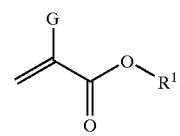

where G is hydrogen, halogen, or an alkyl having from 1 to 4 carbon atoms, $R^1$ has from 1 to 16 carbon atoms and is an alkyl, cycloalkyl, alkenyl, cycloalkenyl, alkaryl, aralkyl, or aryl group, optionally substituted or interrupted with silane, silicon, oxygen, halogen, carbonyl, hydroxyl, ester, carboxylic acid, urea, urethane, carbamate, amine, amide, sulfur, sulfonate, or sulfone;

a di- or tri-(meth)acrylate, such as polyethylene glycol di(meth)acrylates, bisphenol-A di(meth)acrylates, tetrahydrofurane di(meth)acrylates, hexanediol di(meth) acrylate, trimethylol propane tri(meth)acrylate, or combinations thereof; and an acrylate ester represented by the formula:

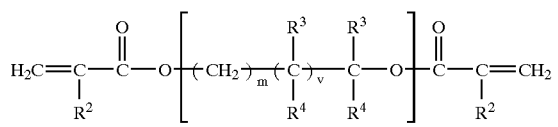

where $R^2$ is hydrogen, halogen, or an alkyl having about 1 to about 4 carbon atoms, $R^3$ is hydrogen, an alkyl having about 1 to about 4 carbon atoms, hydroxyalkyl having about 1 to about 4 carbon atoms or

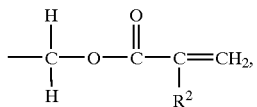

$R^4$ is hydrogen, hydroxy or

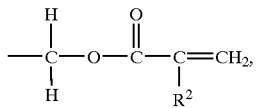

and m is 1 to 8, n is 1 to 20, and v is 0 or 1. Preferably, the (meth)acrylate component includes polyethylene glycol di(meth)acrylates, bisphenol-A di(meth)acrylates, tetrahydrofurane (meth)acrylates and di(meth)acrylates, citronellyl acrylate and citronellyl methacrylate, hydroxypropyl (meth)acrylate, hexanediol di(meth)acrylate, trimethylol propane tri(meth)acrylate, tetrahydrodicyclopentadienyl (meth)acrylate, ethoxylated trimethylol propane triacrylate, triethylene glycol acrylate, triethylene glycol methacrylate, and combinations thereof.

Other suitable acrylate esters are represented by the formula:

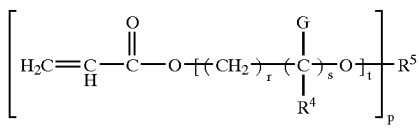

where r is zero or a positive integer, s is zero or 1, t is an integer from 1 to 20, and p is 2, 3 or 4; G and $R^4$ are as defined above; and $R^5$ denotes an organic radical of valency s linked through a carbon atoms or carbon atoms thereof to the indicated t number of oxygen atoms. Preferably, r, s, and t are 1, G is hydrogen or methyl, and $R^5$ is a hydrocarbon residue of an aliphatic polyhydric alcohol having from 2 to 6 carbon atoms, such as a pentaerythrityl group. A specific example of such compounds is pentaerythrityl tetrakis (dimethylene glycol acrylate).

Yet other suitable esters are those of formula

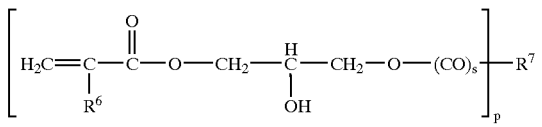

where s and p have the meanings previously assigned, $R^6$ is hydrogen or methyl, and $R^7$ is an organic radical of valency p, linked through a carbon atom thereof other than the carbon atom of a carbonyl group. More particularly, when s is zero, $R^7$ may denote the residue, containing from 1 to 60 carbon atoms, of an alcohol or phenol having p hydroxyl groups. $R^7$ may thus represent an aromatic, araliphatic, alkaromatic, cycloaliphatic, heterocyclic, or heterocycloaliphatic group, such as an aromatic group containing only one benzene ring, optionally substituted by chlorine, bromine or an alkyl group of from 1 to 9 carbon atoms, or an aromatic group comprising a chain of two to four benzene rings, optionally interrupted by ether oxygen atoms, aliphatic hydrocarbon groups of 1 to 4 carbon atoms, or sulphone groups, each benzene ring being optionally substituted by chloride, bromine or an alkyl group of from 1 to 9 carbon atoms, or a saturated or unsaturated, straight or branched-chain aliphatic group, which may contain ether oxygen linkages and which may be substituted by hydroxyl groups, especially a saturated or monoethylenically unsaturated straight chain aliphatic hydrocarbon group of from 1 to 8 carbon atoms.

Specific examples of such groups are the aromatic groups of the formulae $—C_6H_4C(CH_3)_2C_6H_4—$, in which case p is 2, and $—C_6H_4(CH_2C_6H_3—)_w—CH_2C_6H_4—$ wherein w is 1 or 2, in which case p is 3 or 4, and the aliphatic groups of formula $—CH_2CHCH_2—$ or $—CH_2CH(CH_2)_3CH_2—$, in which case p is 3, or of formula $—(CH_2)_4—$, $—CH_2CH=CHCH_2—$, $—CH_2CH_2OCH_2CH_2—$, or $—(CH_2CH_2O)_2CH_2CH_2—$, in which case p is 2. When s is 1, $R^7$ may represent the residue, containing from 1 to 60 carbon atoms, of an acid having p carboxyl groups, preferably a saturated or ethylenically unsaturated, straight chain or branched aliphatic hydrocarbon group of from 1 to 20 carbon atoms, which may be substituted by chlorine atoms and which may be interrupted by ether oxygen atoms and/or by carbonyloxy (—COO—) groups, or a saturated or ethylenically unsaturated cycloaliphatic or aliphatic-cycloaliphatic hydrocarbon group of at least 4 carbon atoms, which may be substituted by chlorine atoms, or an aromatic hydrocarbon group of from 6 to 12 carbon atoms which may be substituted by chlorine or bromine atoms.

Further preferred compounds wherein s is 1 are those in which $R^7$ represents a saturated or ethylenically unsaturated straight chain or branched aliphatic hydrocarbon group of from 1 to 8 carbon atoms, optionally substituted by a hydroxyl group, or a saturated or ethylenically unsaturated straight chain or branched aliphatic hydrocarbon group of from 4 to 50 carbon atoms and interrupted in the chain by carbonyloxy groups, or a saturated or ethylenically unsaturated monocyclic or bicyclic cycloaliphatic hydrocarbon group of 6 to 8 carbon atoms, or an ethylenically unsaturated cycloaliphatic-aliphatic hydrocarbon group of from 10 to 51 carbon atoms, or a mononuclear aromatic hydrocarbon group of from 6 to 8 carbon atoms. Specific examples of these residues of carboxylic acid are those of formula $—CH_2CH_2—$, $CH=CH—$, and $—C_6H_4—$ where p is 2.

Specific examples of suitable compounds of the preceding formula are epoxy acrylates such as 1,4-bis(2-hydroxy-3 (acryloyloxy)propoxy)butane, poly(2-hydroxy-3-(acryloyloxy)propyl)ethers of bis(4-hydroxyphenyl) methane (bisphenol F), 2,2-bis(4-hydroxyphenyl)propane (bisphenol A) and phenol-formaldehyde novolaks, bis(2-hydroxy-3-acryloyloxypropyl) adipate and the methacryloyloxy analogues of these compounds.

Still other suitable esters are urethane acrylates and ureide acrylates represented by the formula:

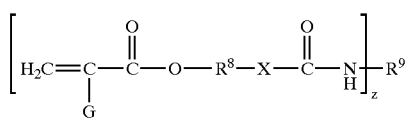

where G has the meaning assigned above, $R^8$ denotes a divalent aliphatic, cycloaliphatic, aromatic, or araliphatic group, bound through a carbon atom or carbon atoms thereof indicated at the —O— atom and —X— atom or group, X denotes —O—, —NH—, or —N(alkyl)-, in which the alkyl radical has from 1 to 8 carbon atoms, z is an integer of at least 2 and at most 6, and $R^9$ denotes a z-valent cycloaliphatic, aromatic, or araliphatic group bound through a carbon atom or carbon atoms thereof to the indicate NH groups. Preferably $R^8$ denotes a divalent aliphatic group of 2 to 6 carbon atoms and $R^9$ denotes one of the following: a divalent aliphatic group of 2 to 10 carbon atoms, such as a group of formula: —$(CH_2)_6$—, $CH_2C(CH_3)_2CH_2CH(CH_3)(CH_2)$—, or —$CH_2CH(CH_3)CH_2C(CH_3)_2CH_2)_2$—; or a phenylene group, optionally substituted by a methyl group or a chlorine atom; a naphthylene group; a group of formula: —$C_6H_4C_6H_4$—, $C_6H_4CH_2C_6H_4$—, or —$C_6H_4C(CH_3)_2C_6H_4$—; or a mononuclear alkylcycloalkylene or alkylcycloalkylalkylene group of from 63 to 10 carbon atoms, such as a methylcyclohex-2,4-ylene, methylcyclohex-2,6-ylene, or 1,3,3-trimethylcyclohex-5-ylenemethyl group. Specific examples include 2,4- and 2,6-(bis(2-acryloyloxyethoxy carbonamido) toluene and the corresponding methacryloyloxy compounds.

The (meth)acrylate component may further include stabilizers, accelerators, fillers, opacifiers, thickeners, viscosity modifiers, adhesion promoters, inhibitors, thixotrophy conferring agents, tougheners, anti-oxidizing agents, anti-reducing agents, and combinations thereof. In the case of UV radiation curable compositions, photoinitiators would be added. These optional additives are used in an amount that do not significantly adversely affect the polymerization process or the desired properties of the cured composition A preferred (meth)acrylate component useful in the present invention includes about 20 to about 80 wt. %, more preferably about 52 wt. %, difunctional acrylate oligomers, about 20 to about 80 wt. %, more preferably about 38 wt. %, monofunctional acrylate monomers, about 0 to about 10 wt. %, more preferably about 7 wt. %, adhesion promoters; about 0 to about 1 wt. %, more preferably about 0.2 wt. %, stabilizers; and about 0 to about 10 wt. %, more preferably about 3 wt. %, photoinitiators.

A particularly preferred photopolymerizable (meth) acrylate component may be prepared by admixing the following ingredients in the amounts indicated (in parts by weight): 3090 parts of an acrylated polyurethane (toluene diisocyanate-capped polyether having a molecular weight of about 400, acrylated by reaction with hydroxyethyl methacrylate); 3708 parts isobornylacrylate ("IBOA"), free of sulfur and amine-containing stabilizers; 2163 parts hydroxyethyl methacrylate ("HEMA"); 618 parts acrylic acid; 93 parts of a silane adhesion promoter; 25 parts of a hydroquinone stabilizer; and 124 parts of 1-hydroxycyclohexylphenyl ketone, as a photoinitiator.

The fluorescent dyes which are useful in the present invention are substantially soluble in and non-reactive with the (meth)acrylate component and do not adversely affect the curing properties of the monomer. Those dyes which adversely effect the storage stability of the (meth)acrylate component are also undesirable. The preferred compositions of the present invention include the (meth)acrylate component and fluorescent dye were found to exhibit good stability having a shelf life of greater than about 1 year at or about room temperature. Shelf life was determined by heating the compositions in glass tubes at 82° C.

The dyes suitable for use in accordance with the present invention are present in an amount sufficient to impart observable color when the composition is cured, preferably about 50 to about 1000 ppm, and more preferably, about 100 to about 400 ppm based on an amount of the (meth)acrylate monomer.

Those dyes classified as xanthenes and anthraquinones are preferred, particularly those which can be readily solubilized in the (meth)acrylate component in the chosen amount and do not adversely affect the curing of the monomer. Xanthenes are characterized by the following structure:

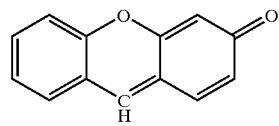

Fluorans are a preferred class of xanthene dyes suitable for use in the present invention. Particularly preferred fluorans comprise fluorescein (D&C Yellow #7), dibromofluorescein (D&C Orange #5), diiodofluorescein (D&C Orange #10), tetrabromofluorescein (D&C Red #21), and tetrabromotetrachlorofluorescein (D&C Red #27, also known as Pylam Red #27). Anthraquinone dyes are characterized by the following structure:

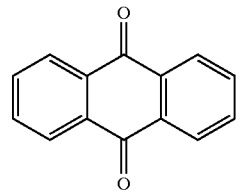

Preferred anthraquinone dyes are 7,16-dichloro-6,15-dihydro-5,9,14,18-anthrazine-tetrone (D&C Blue #9), the disodium salt of 2,2'-[(9,10-dihydro-9,10-dioxo-1,4-anthracenediyl)diimino]bis-[5-methylbenzenesulfonic acid (D&C Green #5), 1,4-bis(4'-methylanilino)anthraquinone (D&C Green #6), and 1-hydroxy-4-(4-methylanilino) anthraquinone (D&C Violet #2). D&C is the category of dyes and pigments considered safe for drugs and cosmetics by the U.S. Food and Drug Administration when in contact with mucous membranes or when ingested.

The dye is substantially dissolved in the (meth)acrylate component thereby producing a composition having a first color which is also fluorescent under black light conditions. The color intensity of the composition is dependent upon the amount of dye used. The composition is typically a liquid but its viscosity may be modified to an extent to reach a non-flowable gel depending on the amount of thickeners added to adjust the viscosity of the composition. The viscosity range of the compositions of the present invention may be from about 5 cps to a non-flowable gel. Unexpectedly, when the colored composition is exposed to conditions appropriate for cure, the composition undergoes a visible color change, preferably becoming clear or color-free, as it cures. The visible color change may be from substantially pink/red or fluorescent yellow/green to substantially color-free. The resultant cured composition no longer exhibits fluorescence under black light. The color change and/or change in fluorescence provides an advantageous cure indicator for the end user to readily determine without the use of sophisticated and expensive detection equipment when the adhesive has substantially cured.

The compositions of the present invention may be used in a method of detecting substantially full cure of an adhesive comprising the steps of providing a first article and a second article; providing, on a surface of the first article, a fluorescent adhesive; contacting a surface of the second article to the surface of the first article having the adhesive thereon; exposing the first and second articles to cure conditions; and detecting the absence of fluorescence of the adhesive. The adhesive includes a (meth)acrylate component and a fluorescent dye and cure conditions would be similar to those conditions expressed in Examples 1 to 3 below.

The above process provides an excellent means of assembling and inspecting a series of articles having an adhesive bond line. Two or more articles would be adhered together with the composition of the present invention comprising the (meth)acrylate component and the fluorescent dye, such that an adhesive bond line is formed between the articles. Upon exposing the article to cure conditions, the initially colored and fluorescent composition becomes visibly color-free and non-fluorescent. Thus, detecting the absence of fluorescence at the bond lines provides a self-indication of substantially full cure.

The following examples describe the preparation and use of the colored (meth)acrylate compositions of the present invention. These examples are presented for the purpose of further illustrating and explaining the invention, and are not to be taken as limiting the scope of the invention.

EXAMPLES

Commercially available LOCTITE® Products 3311, 3393 and 3394 were used in the examples below. They are single component acrylate based adhesives of low, medium and high viscosity, respectively, which are UV/VIS light curable.

Example 1

To the acrylate based adhesive LOCTITE® Product 3311, 100 ppm of D&C Red #27 was added. The mixture was mixed by hand with a spatula to form a visible pink/red homogeneous liquid composition which also luminesced under black light. A portion of the composition was cured on a glass slide by exposure to a Zeta 7200 UV light source for about 10 to about 15 seconds at 168 milliwatts/cm$^2$ at 365 nm. The resultant cured composition was substantially visually color-free and no longer fluorescent.

Example 2

To the acrylate based adhesive LOCTITE® Product 3493, 100 ppm of D&C Red #27 was added. The mixture was mixed by hand with a spatula to form a visible pink/red homogeneous liquid composition which also luminesced under black light. A portion of the composition was cured on a glass slide by exposure to a Zeta 7200 UV light source for about 10 to about 15 seconds at 168 milliwatts/cm$^2$ at 365 nm. The resultant cured composition was substantially visually color-free and no longer fluorescent.

Example 3

To the acrylate based adhesive LOCTITE® Product 3494, 100 ppm of D&C Red #27 was added. The mixture was mixed by hand with a spatula to form a visible pink/red homogeneous liquid composition which also luminesced under black light. A portion of the composition was cured on a glass slide by exposure to a Zeta 7200 UV light source for about 10 to about 15 seconds at 168 milliwatts/cm$^2$ at 365 nm. The resultant cured composition was substantially visually color-free and no longer fluorescent.

Examples 1 to 3 show that upon cure, the (meth)acrylate compositions of the present invention provide a self indicator of cure. The change in color and fluorescence provide an unexpected means for a user to determine cure on production lines without expensive instrumentation and space restrictions.

While the present invention has been particularly described, in conjunction with a specific preferred embodiment, it is evident that many alternatives, modifications and variations will be apparent to those skilled in the art in light of the foregoing description. It is therefore contemplated that the claims embrace any such alternatives, modifications and variations as falling within the true scope and spirit of the present invention.

What is claimed is:

1. A method of detecting substantially full cure of an adhesive comprising the steps of providing a first article and a second article; providing, on a surface of the first article, a (meth)acrylate composition comprising:

a (meth)acrylate component; and a dye substantially dissolved in said (meth)acrylate component which imparts a first color to said (meth)acrylate component, wherein upon curing, a resultant cured composition has a second color, and wherein said dye comprises xanthene dyes, and optionally, anthraquinone dyes, wherein said xanthene dye is selected from the group consisting of fluorescein, dibromofluorescein, diiodofluorescein, tetrabromofluorescein, tetraiodofluorescein, tetrabromotetrachlorofluorescein and combinations thereof;

contacting a surface of the second article to the surface of the first article having the (meth)acrylate composition thereon; and exposing the first and second articles to cure conditions.

2. The method of claim 1, further including the step of detecting the absence of the first color after exposing the first and second articles to cure conditions.

3. The method of claim 1, wherein upon curing, the resultant cured composition is substantially free of the first color.

4. The method of claim 1, wherein said (meth)acrylate component comprises one or more members selected from the group consisting of a monomer represented by the formula:

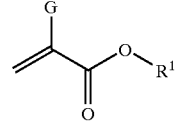

wherein G is hydrogen, halogen, or an alkyl having from 1 to 4 carbon atoms, R$^1$ has from 1 to 16 carbon atoms and is an alkyl, cycloalkyl, alkenyl, cycloalkenyl, alkaryl, aralkyl, or aryl group, optionally substituted or interrupted with silane, silicon, oxygen, halogen, carbonyl, hydroxyl, ester, carboxylic acid, urea, urethane, carbamate, amine, amide sulfur, sulfonate, or sulfone;

a di- or tri- (meth)acrylate comprising polyethylene glycol di(meth)acrylates, bisphenol-A di(meth)acrylates, tetrahydrofurane di(meth)acrylates, hexanediol di(meth)

acrylate, trimethylol propane tri(meth)acrylate, or combinations thereof; and an acrylate ester represented by the formula:

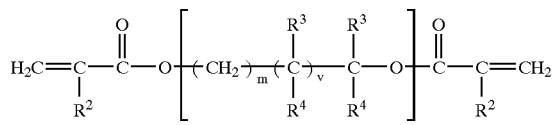

wherein $R^2$ is hydrogen, halogen, or an alkyl having about 1 to about 4 carbon atoms, $R^3$ is hydrogen, an alkyl having about 1 to about 4 carbon atoms, hydroxyalkyl having about 1 to about 4 carbon atoms or

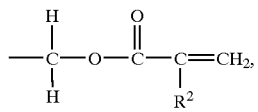

$R^4$ is hydrogen, hydroxy or

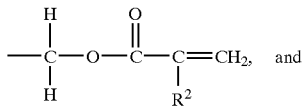 and m is 1 to 8, n is 1 to 20, and v is 0 or 1.

5. The method of claim 1, wherein said (meth)acrylate component comprise urethane acrylates or ureide acrylates represented by the formula:

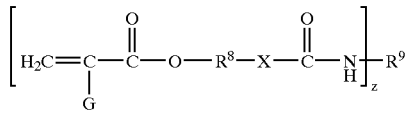

wherein

G is hydrogen, halogen, or an alkyl having from 1 to 4 carbon atoms;

$R^8$ denotes a divalent aliphatic, cycloaliphatic, aromatic, or araliphatic group, bound through a carbon atom or carbon atoms thereof indicated at the —O— atom and —X— atom or group;

X is —O—, —NH—, or —N(alkyl)-, in which the alkyl radical has from 1 to 8 carbon atoms;

z is 2 to 6; and $R^9$ is a z-valent cycloaliphatic, aromatic, or araliphatic group bound through a carbon atom or carbon atoms thereof to the one or more NH groups.

6. The method of claim 1, wherein said (meth)acrylate component includes (meth)acrylate monomers selected from the group consisting of polyethylene glycol di(meth)acrylates, bisphenol-A di(meth)acrylates, tetrahydrofurane (meth)acrylates and di(meth)acrylates, citronellyl acrylate and citronellyl methacrylate, hydroxypropyl (math)acrylate, hexanediol di(meth)acrylate, trimethylol propane tri(meth)acrylate, tetrahydrodicyclopentadienyl (meth)acrylate, ethoxylated trimethylol propane triacrylate, triethylene glycol acrylate, triethylene glycol methacrylate, and combinations thereof.

7. The method of claim 1, wherein said dye is present in an amount of about 50 ppm to about 1000 ppm based on the amount of said (meth)acrylate component.

8. The method of claim 1, wherein said dye is present in an amount of about 100 to about 200 ppm based on the amount of said (meth)acrylate component.

9. The method of claim 1, wherein said dye comprises tetraiodofluorescein.

10. The method of claim 1, further comprising a member selected from the group consisting of stabilizers, accelerators, fillers, opacifiers, thickeners, viscosity modifiers, adhesion promoters, inhibitors, thixotrophy conferring agents, tougheners, anti-oxidizing agents, anti-reducing agents, and combinations thereof.

11. The method of claim 1, wherein prior to the step of exposing the first and second articles to cure conditions, the (meth)acrylate component has a first color which is fluorescent.

12. The method of claim 11, wherein after the step of exposing the first and second articles to cure conditions, the cured composition is substantially free of the first color.

13. The method of claim 11, wherein the step of curing comprises photocuring.

14. A method of assembling and inspecting a series of articles having an adhesive bond line comprising the steps of adhering two or more parts of an article together with a (meth)acrylate composition comprising:
a (meth)acrylate component; and
a dye substantially dissolved in said (meth)acrylate component which imparts a first color to said (meth)acrylate component, wherein upon curing, a resultant cured composition has a second color, and wherein said dye comprises xanthene dyes, and optionally, anthraquinone dyes, wherein said xanthene dye is selected from the group consisting of fluorescein, dibromofluorescein, diiodofluorescein, tetrabromofluorescein, tetraiodofluorescein, tetrabromotetrachlorofluorescein and combinations thereof, wherein an adhesive bond line is formed between the parts of the article; and exposing the article to cure conditions.

15. The method of claim 14, wherein in the step of adhering two or more parts of an article together with the (meth)acrylate composition, the (meth)acrylate composition has a first color.

16. The method of claim 15, further including the step of detecting the absence of the first color after exposing the article to cure conditions.

17. The method of claim 14, wherein upon curing, the resultant cured composition is substantially free of the first color.

18. The method of claim 14, wherein said (meth)acrylate component comprises one or more members selected from the group consisting of a monomer represented by the formula:

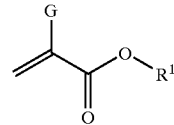

wherein G is hydrogen, halogen, or an alkyl having from 1 to 4 carbon atoms, $R^1$ has from 1 to 16 carbon atoms and is an alkyl, cycloalkyl, alkenyl, cycloalkenyl, alkaryl, aralkyl, or aryl group, optionally substituted or interrupted with silane, silicon, oxygen, halogen, carbonyl, hydroxyl, ester, carboxylic acid, urea, urethane, carbamate, amine, amide, sulfur, sulfonate, or sulfone;

a di- or tri-(meth)acrylate comprising polyethylene glycol di(math)acrylates, bisphenol-A di(ninth)acrylates, tetrahydrofurane di(meth)acrylates, hexanediol di(meth)

acrylate, trimethylol propane tri(meth)acrylate, or combinations thereof; and an acrylate ester represented by the formula:

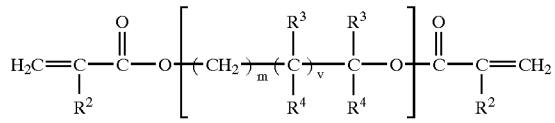

wherein $R^2$ is hydrogen, halogen, or an alkyl having about 1 to about 4 carbon atoms, $R^3$ is hydrogen, an alkyl having about 1 to about 4 carbon atoms, hydroxyalkyl having about 1 to about 4 carbon atoms or

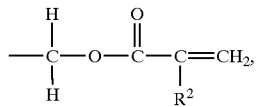

$R^4$ is hydrogen, hydroxy or

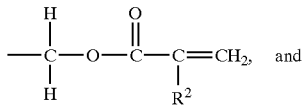   and m is 1 to 8, n is 1 to 20, and v is 0 or 1.

19. The method of claim 14, wherein said (meth)acrylate component comprises urethane acrylates or ureide acrylates represented by the formula:

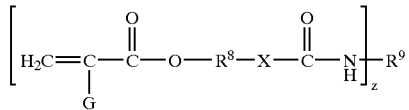

wherein

G is hydrogen, halogen, or an alkyl having from 1 to 4 carbon atoms;

R8 denotes a divalent aliphatic, cycloaliphatic, aromatic, or araliphatic group, bound through a carbon atom or carbon atoms thereof indicated at the —O— atom and —X— atom or group;

X is —O—, —NH—, or —N(alkyl)-, in which the alkyl radical has from 1 to 8 carbon atoms;

z is 2 to 6; and $R^9$ is a z-valent cycloaliphatic, aromatic, or araliphatic group bound through a carbon atom or carbon atoms thereof to the one or more NH groups.

20. The method of claim 14, wherein said (moth)acrylate component includes (meth)acrylate monomers selected from the group consisting of polyethylene glycol di(meth) acrylates, bisphenol-A di(meth)acrylates, tetrahydrofurane (meth)acrylates and di(meth)acrylates, citronellyl acrylate and citronellyl methacrylate, hydroxypropyl (meth)acrylate, hexanediol di(meth)acrylate, trimethylol propane tri(meth) acrylate, tetrahydrodicyclopentadienyl (moth)acrylate, ethoxylated trimethylol propane triacrylate, triethylene glycol acrylate, triethylene glycol methacrylate, and combinations thereof.

21. The method of claim 14, wherein said dye is present in an amount of about 50 ppm to about 1000 ppm based on the amount of said (meth)acrylate component.

22. The method of claim 14, wherein said dye is present in an amount of about 100 to about 200 ppm based on the amount of said (meth)acrylate component.

23. The method of claim 14, wherein said dye comprises tetraiodofluorescein.

24. The method of claim 14, further comprising a member selected from the group consisting of stabilizers, accelerators, fillets, opacifiers, thickeners, viscosity modifiers, adhesion promoters, inhibitors, thixotrophy conferring agents, tougheners, anti-oxidizing agents, anti-reducing agents, and combinations thereof.

25. The method of claim 14, wherein prior to the step of exposing the first and second article to cure conditions, the (meth)acrylate component has a first color which is fluorescent.

26. The method of claim 14, wherein after the step of exposing the article to cure conditions, the cured composition is substantially free of the first color.

27. The method of claim 14, wherein the step of curing comprises photocuring.

* * * * *